United States Patent
Navon et al.

(10) Patent No.: US 12,408,067 B2
(45) Date of Patent: Sep. 2, 2025

(54) SYSTEM, APPARATUS AND METHODS FOR HYBRID FUNCTIONAL SPLITS DESIGN WITH SUPPORT FOR ADVANCED FEATURES IN CELLULAR NETWORKS

(71) Applicant: Parallel Wireless, Inc., Nashua, NH (US)

(72) Inventors: Baruch Navon, Alumot (IL); Steven Paul Papa, Windham, NH (US); Ofir Ben Ari Katzav, Zur Itshak (IL)

(73) Assignee: Parallel Wireless, Inc., Nashua, NH (US)

( * ) Notice: Subject to any disclaimer, the term of this patent is extended or adjusted under 35 U.S.C. 154(b) by 264 days.

(21) Appl. No.: 17/875,507

(22) Filed: Jul. 28, 2022

(65) Prior Publication Data

US 2023/0029784 A1 Feb. 2, 2023

Related U.S. Application Data

(60) Provisional application No. 63/226,729, filed on Jul. 28, 2021.

(51) Int. Cl.
*H04W 28/02* (2009.01)
*H04W 88/08* (2009.01)

(52) U.S. Cl.
CPC ..... *H04W 28/0221* (2013.01); *H04W 88/085* (2013.01)

(58) Field of Classification Search
CPC .......... H04W 28/0221; H04W 88/085
See application file for complete search history.

(56) References Cited

U.S. PATENT DOCUMENTS

| | | | |
|---|---|---|---|
| 11,515,948 B2* | 11/2022 | Oh | H04B 10/25753 |
| 11,812,302 B2* | 11/2023 | Rajagopal | H04B 7/0456 |
| 2021/0400527 A1* | 12/2021 | Notargiacomo | H04W 28/26 |
| 2023/0209549 A1* | 6/2023 | Amuru | H04W 28/02 |
| | | | 370/329 |

OTHER PUBLICATIONS

Jordan: "Open RAN functional splits, explained", Feb. 24, 2021, Parallel Wireless, https://www.5gtechnologyworld.com/open-ran-functional-splits-explained/.
5G; NG-RAN; Architecture description (3GPP TS 38.401 version 16.6.0 Release 16), Aug. 2021.
Andersson: "Functional Splits: the foundation of an Open 5G RAN", May 17, 2021, https://www.5gtechnologyworld.com/functional-splits-the-foundation-of-an-open-5g-ran/.

\* cited by examiner

*Primary Examiner* — Chandrahas B Patel
(74) *Attorney, Agent, or Firm* — Michael Y. Saji

(57) ABSTRACT

A method and computer readable media are described for providing hybrid functional splits for a system. In one example embodiment a method includes defining, for a system having a Radio Unit (RU) and a Distributed Unit (DU) a Centralized Unit (CU) and an interface protocol between the RU to the DU and to the CU, a plurality of split options for balancing computer power and spectral efficiency, the plurality of split options including a split option 6 in which users are served by a single cell; and a split option 7.x in which users are served by multi-cell joint processing.

16 Claims, 7 Drawing Sheets

SYSTEM, APPARATUS AND METHODS FOR HYBRID FUNCTIONAL SPLITS DESIGN WITH SUPPORT FOR ADVANCED FEATURES IN CELLULAR NETWORKS

CROSS-REFERENCE TO RELATED APPLICATIONS

This application claims priority under 35 U.S.C. § 119(e) to U.S. Provisional Pat. App. No. 63/226,729, filed Jul. 28, 2021, titled "System, Apparatus and Methods for Hybrid Functional Splits Design with Support for Advanced Features in Cellular Networks" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014; U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Virtual-RAN is assumed to be the new and desirable architecture for future cellular networks. In this architecture, a functional split is defined between a distributed unit (DU), centralized unit (CU) and Radio Unit (RU) with a goal to break the strong coupling of software and hardware design per standard. Moreover, 5G adaptation depends on the flexibility required for software modifications combined with even stronger requirement to keep/lower DU and/or RU hardware installation/upgrade cost. In other words, the Virtual-RAN architecture defined such that DU/RU hardware upgrades will be limited or even not required during the evolution of 5G while digital baseband (BB) design, including Modem part, will be easily changeable by software upgrade. Such flexibility is achievable since the DU should run on a computationally strong generic platform and the RU is usually maintained as a generic element. In addition, functional splits can provide the cellular operators the ability to mix and match different vendors into single service. Such flexibility will drive the cellular industry to higher level of competition and differentiation factors which will immediately translate to reduced financial investment and end user benefits.

Virtual-RAN architecture defines several split options between the PHY/RF layers to the upper layers. The main differences between the split options are the required data rates and latency limitations, where higher data rates and stricter latency requirements will be needed when the split is done closer to the RF part. The other side of this tradeoff is the compute complexity needed at the DU or CU when lower split option is used. Extreme example is split option 8 (or 7.x) which depicts that the complete PHY processing is done outside the RU and thus, requires extensive compute power, especially when considering massive MIMO, MU-MIMO, CoMP scenarios and more. The increase compute intensity derived mainly from the need to run a complete PHY processing, especially FECs (Turbo codes or LDPC) on a CPU that was not designed for extensive signal processing operations nor to be FEC compute optimized.

Another angle of this tradeoff is where to load the non-RU functionality. One scenario is to include the PHY processing in a DU located on-site. In such case, a generic processor will provide higher flexibility to the cellular operators in terms of RAT vendor provider. The other alternative is to include HW based accelerations with higher chances to be vendor locked which is against the main agenda of the virtualized-RAN approach. A second scenario depicts that the PHY processing is done in a CU remote to the site. In such case, it will be easier to the cellular vendors to create highly capable compute platform that can support multiple sites with one or multiple RAT service providers. In this scenario, HW based accelerators are even less preferred.

Each functional split provides its benefits and have its drawbacks. More logically right approach will be to use split option 6, in which the PHY processing is done in the RU and the L2 and above can be in a DU or a CU. In such case, the PHY is commonly executed on dedicated processors which are suited to signal processing operations and hence clears the compute intensiveness concern. One shall note that in this split option, the PHY processor can still be a generic processor and not a dedicated one or any combination of general-purpose CPU and HW acceleration aids. The major drawback of this approach is losing the ability to support advanced features which requires multi-PHYs operations/processing, a simple example is uplink CoMP which considered as cell coverage and performance enhancement feature and is being used in dense deployments (usually urban deployments). Advanced features which requires joint processing of the different PHY layers cannot be just ignored, otherwise, the limitations to the cellular performances will be noticeable.

SUMMARY

Presented herein is an approach to accommodate such limitation in split option 6 in an efficient manner from implementation and compute power point of views. Our approach defines a hybrid split option 6 and split option 7.2 which can balance well the compute power and division of labor between the RU and DU/CU under the assumption that joint processing of the data is needed in partial time/resources (e.g. RBs in 4G/5G). Intuitive example coming from CoMP approach is the simple fact that it's not always efficient to apply CoMP to a user in cell center in which the signals at/from neighbor cells is not adding enough benefit for the data decoding. In the later, a single cell communication will be the right choice to balance compute power and spectral efficiency. We propose to employ a hybrid approach, in which some of the users are served by a single cell, namely with split option 6, while other users are served by a multi-cell (e.g. in CoMP scenario), joint processing, using split option 7.x. Such hybrid approach fits well in the common split architectures and utilizes existing infrastructures with additional minor control data. The main benefit of this approach is a balanced system in terms of compute efficiency of the overall system RU-DU-CU.

In one example embodiment a method includes defining, for a system having a Radio Unit (RU) and a Distributed Unit (DU) a Centralized Unit (CU) and an interface protocol between the RU to the DU and to the CU, a plurality of split options for balancing computer power and spectral efficiency, the plurality of split options including a split option 6 in which users are served by a single cell; and a split option 7.x in which users are served by multi-cell joint processing.

In another example embodiment a method includes defining, for a system having a Radio Unit (RU) and a Distributed Unit (DU) a Centralized Unit (CU) and an interface protocol between the RU to the DU and to the CU, a plurality of split options for balancing computer power and spectral efficiency, the plurality of split options including a split option 6 in which users are served by a single cell; and a split option 7.x in which users are served by multi-cell joint processing.

In another example embodiment a non-transitory computer-readable medium includes instructions for providing hybrid functional splits for a system which, when executed, cause the system to perform steps comprising defining, for a system having a Radio Unit (RU) and a Distributed Unit (DU) a Centralized Unit (CU) and an interface protocol between the RU to the DU and to the CU, a plurality of split options for balancing computer power and spectral efficiency, the plurality of split options including a split option 6 in which users are served by a single cell; and including a split option 7.x in which users are served by multi-cell joint processing.

DETAILED DESCRIPTION

Figure 1:
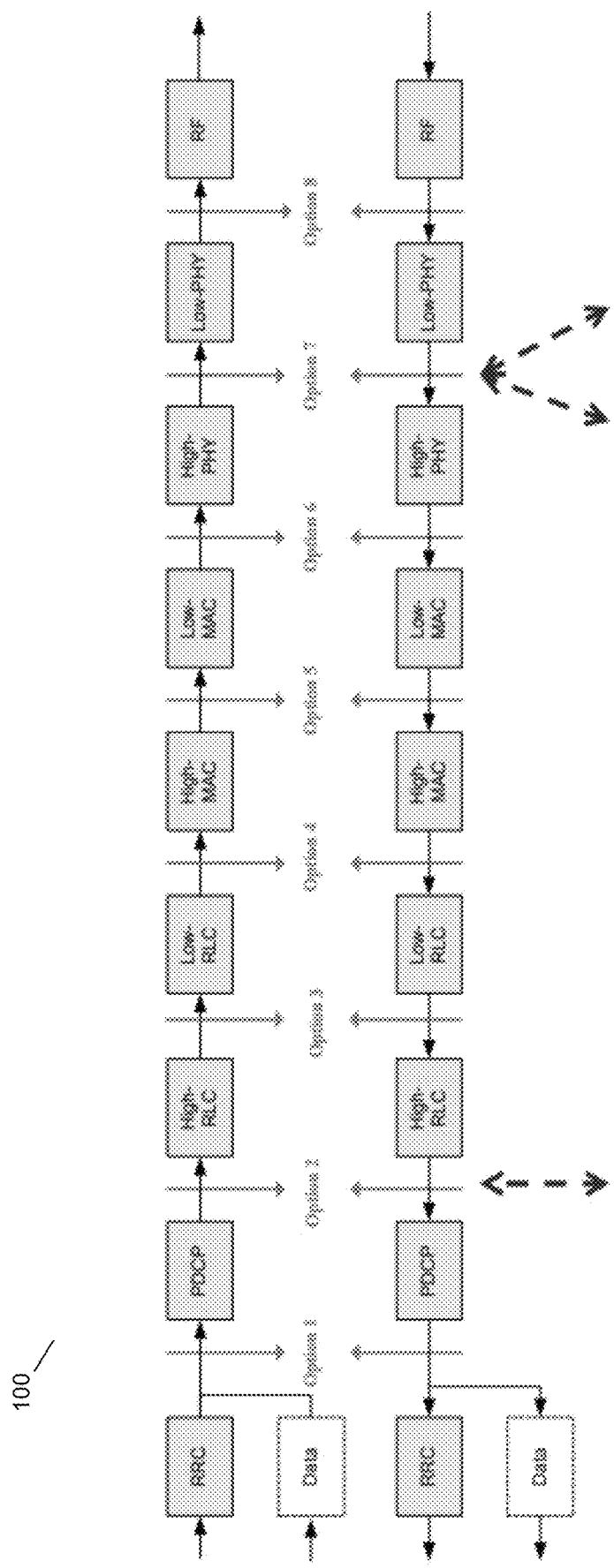
FIG. 1 is a diagram of split options, in accordance with some embodiments.

In FIG. 1 split options 1 to 8 100 are presented. Split option 8 defines a split at the ADC output and DAC input. This option is the most demanding one in terms of data rate and latency. Split option 7 defines a split within the PHY layer and will be discussed in the sequel. Split option 6 defines a split between the PHY and the MAC which is considered relatively each to implement and doesn't require high data rates compared to options 7 and 8. Other options presented in the figure above won't be covered in this document since those splits are technology dependent and less of an interest of this work.

Figure 2:
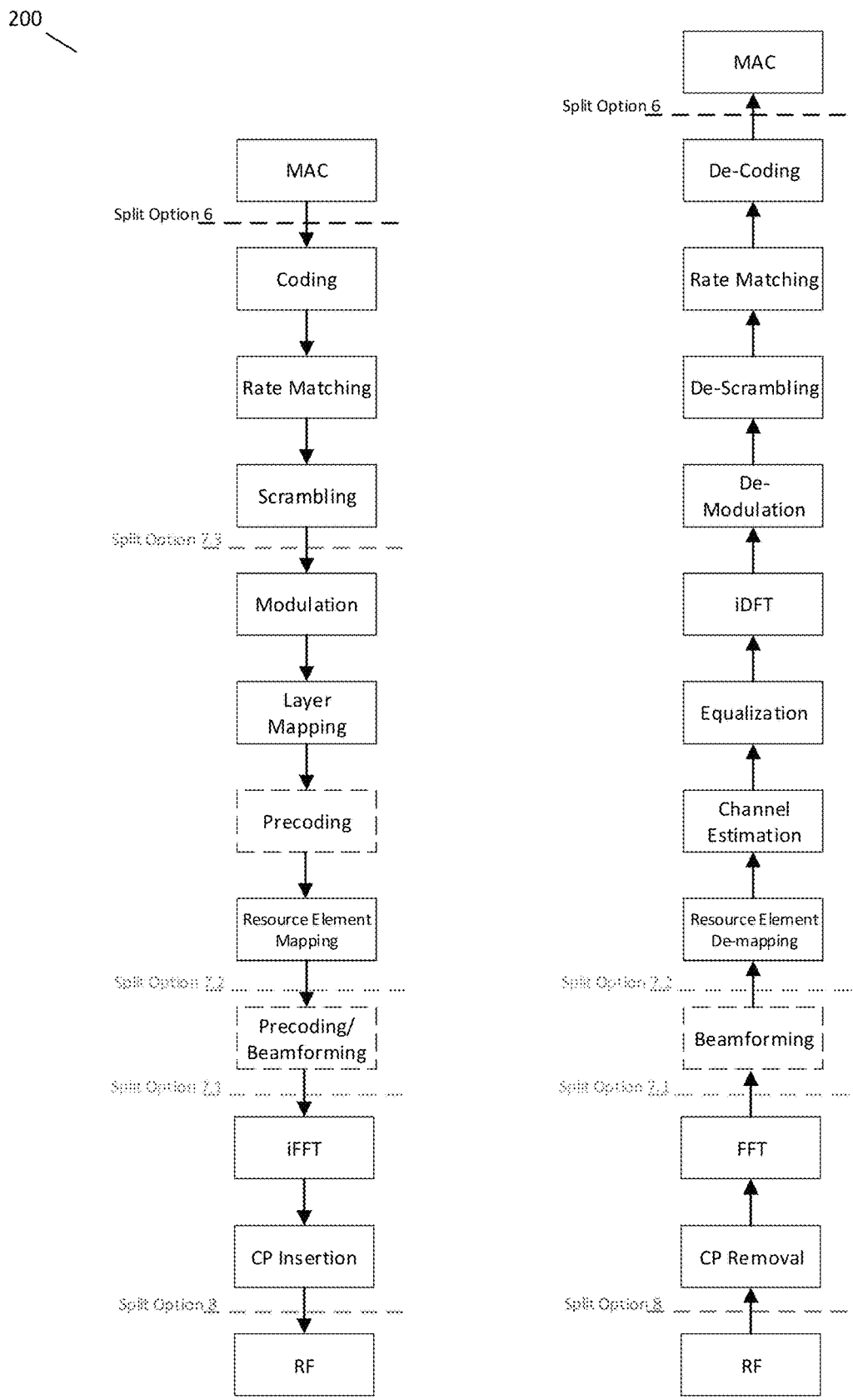
FIG. 2 is a diagram of split option 7 sub-options, in accordance with some embodiments.

Split option 7 can be then divided into sub-options 200 as shown in FIG. 2

Split option 7.1 defines a split between the time-domain and frequency domains of the PHY. This option serves well the concept of easily changing the frequency domain implementation at the CU.

Split option 7.2 includes the precoding/beamforming handling on top of Split option 7.1 in the RU. Note that the O-RAN standard defines multiple categories to implement the precoding and beamforming—those are marked in dashed lines in the diagram Split option 7.3 defines a split at the modulation block. It may or may not include the scrambling block.

We propose the following system and related functionality:

An RU aggregating RF capability and compute platform where: RF capabilities suited for one or more cellular standards, specifically (but not only) 4G, 5G. Compute platform such as ASIC, SoC, general purpose CPU, GPU or equivalent. PHY processing design/SW capable of running complete PHY processing (e.g. option 6) with infrastructure to exercise the full or partial processing abilities in flexible manner. Interfacing capabilities to a DU/CU.

A DU and/or CU capable of running one or more cellular protocol stack SW including: Interfacing capabilities to one or more RUs distributed in space and/or co-located. Scheduling mechanism with suitable algorithms to decide when to apply single or joint processing of the data. Knowledge of neighbor and co-located RU acquired statically (pre-configured) or adapted dynamically. PHY-manager: Management logic for per user/resource (e.g. RB/BWP) to exercise split option 6 or 7.x based on the needed processing capabilities. Single or multi stream PHY processing capabilities with joint processing capabilities.

Interface protocol between the RU to DU/CU including: Capabilities to transport data path traffic and control information per time unit (e.g. TTI in 4G/5G). O-RAN based protocol or equivalent (e.g. serial, or non-standard) regardless of the physical design of the protocol (e.g. CPRI/eCPRI/PCIe/etc.).

During scheduling process, the scheduler will mark which part of the DL and/or UL shall be processed with joint processing (e.g. UL CoMP) and which part shall be processed by single PHY. Based on the scheduler definition, the protocol stack shall provide the data path packets (in DL) and the control data to the PHY manager. In turn, the PHY manager will distribute the single PHY processing data and control data to the relevant RU, where each such RU will exercise split option 6 functionality. The rest of the data path packets required for joint processing will exercise split option 7.x on the RU and the rest of the processing of the upper PHY will be done in the DU or CU.

Figure 3:
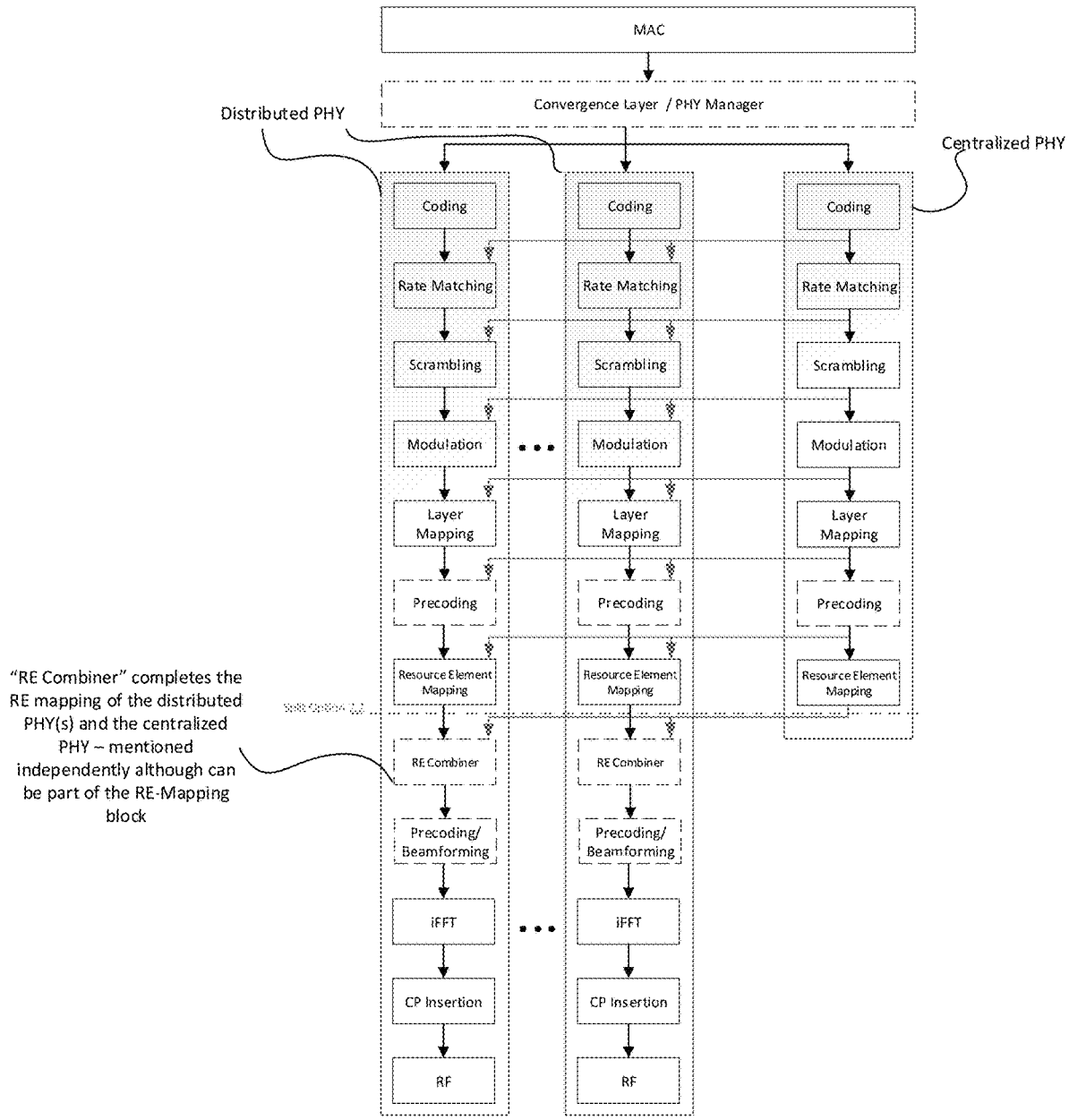
FIG. 3 is a diagram showing a downlink path of 4G/5G system and the different options for hybrid split option design, in accordance with some embodiments.
Figure 4:
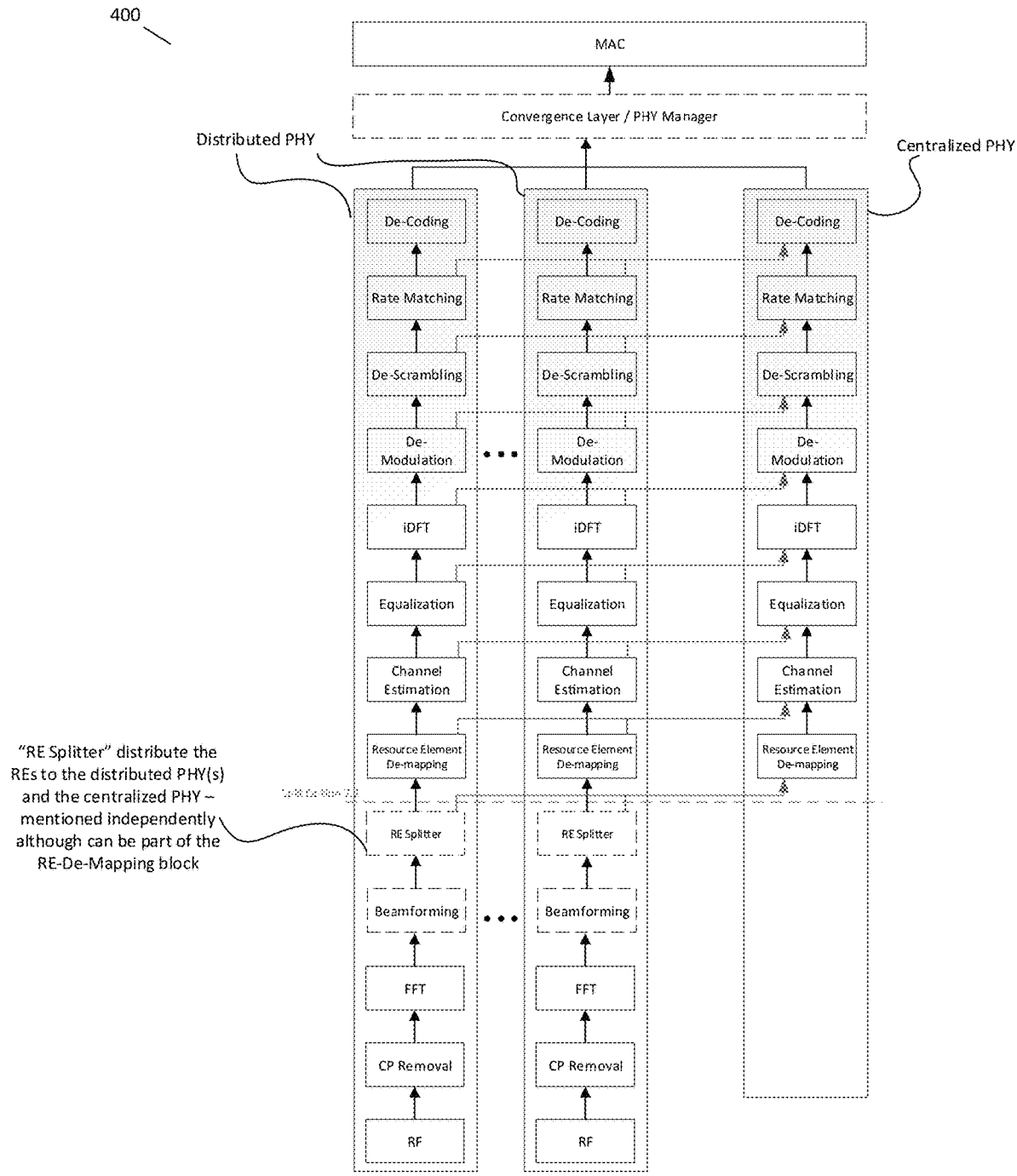
FIG. 4 is a diagram of an uplink path of 4G/5G system and the different options for hybrid split option design, in accordance with some embodiments.

FIG. 3 illustrates a downlink path 300 of 4G/5G system and the different options for hybrid split option design:

FIG. 4 illustrates the uplink path 400 of 4G/5G system and the different options for hybrid split option design.

Fully capable RU to process PHY layer control data and data path packets with additional control per time frame (e.g. TTI) to decide which functional split option to employ.

Per each time frame (e.g. TTI), the PHY entity on the RU will be controlled to exercise option 8 or option 7.x (few options as per standard) or option 6.

The RU PHY entity shall be capable of employing different split option for DL and UL with or without mutual dependency. The RU PHY entity shall be capable of processing different parts of the spectrum in the same time unit in the split option defined by the control. More specifically, the RU PHY entity shall be able to process the data with either selected split option without the limitation of employing same split option per time unit on the entire resources (spectrum/users/BWP/etc.).

The DU or CU holds PHY processing capabilities for control data and data path packets with joint processing capabilities. Namely, the ability to process multi layers, multi stream data coming from single or multiple RUs.

PHY manager entity distribute the control data and data path packets between the CU/DU PHY entity/entities and the RU's PHY entities based on the scheduler/SON decisions per time frame (e.g. TTI). The PHY manager can be a standalone entity or part of a centralized PHY entity. The PHY manager can act as adaptation layer between the different PHY entities and the protocol stack.

Protocol stack and/or SON hold a decision mechanism to indicate per time unit (e.g. TTI) which users/resources require single PHY processing or joint processing. Decision can be made based on neighbor's measurement and/or, signal quality matrixes and/or user location and/or side information shared between the base stations or any other decision mechanism to quantify the benefit of joint processing compared to single PHY processing. With or without allocating users to dedicated spectral resources per time unit such that joint processing is needed at a dedicated partial part of the system resources. Namely, with or without defining part of the spectrum as joint processing zone. With or without adding considerations for HW resource capabilities (e.g. processing unit available capabilities).

Enhanced protocol abilities to allow split option decision control per PHY entity. Embedding selected split option to exercise per DL and UL together or separately per time frame (e.g. TTI) in the configuration message(s). Dedicated control message(s) to carry the selected split option per DL and UL together or separately per time frame (e.g. TTI). Embedding the selected split option to exercise per DL and UL together or separately per time frame (e.g. TTI) in the header of the data path packets. As a dedicated C-plane message based on O-RAN standard framing. As a user extension for either C-plan or U-plane. As dedicated transmit or receive mode definition as extension to currently defined ones by 3GPP or by new mode.

The above apply for beamforming cases as well with or without dynamic decision to perform the precoding operation on the RU or the DU/CU. Dedicated control can be added to signal which entity (e.g. RU PHY or CU/DU PHY) perform the precoding and/or combining functionality.

The above apply for scenarios where the DU/CU connected to any type of small cell (e.g. femto cells) where the small cell designed in either split option defined by the standard or as complete, stand alone, solution. In that, we extend our approach to process split option 7.x data path packets from full solution base station like femto cell. This approach depicts upper PHY and protocol stack processing on CU/DU instead of the standalone small cell unit in cases where the small cell data can provide performance improvement.

Figure 5:
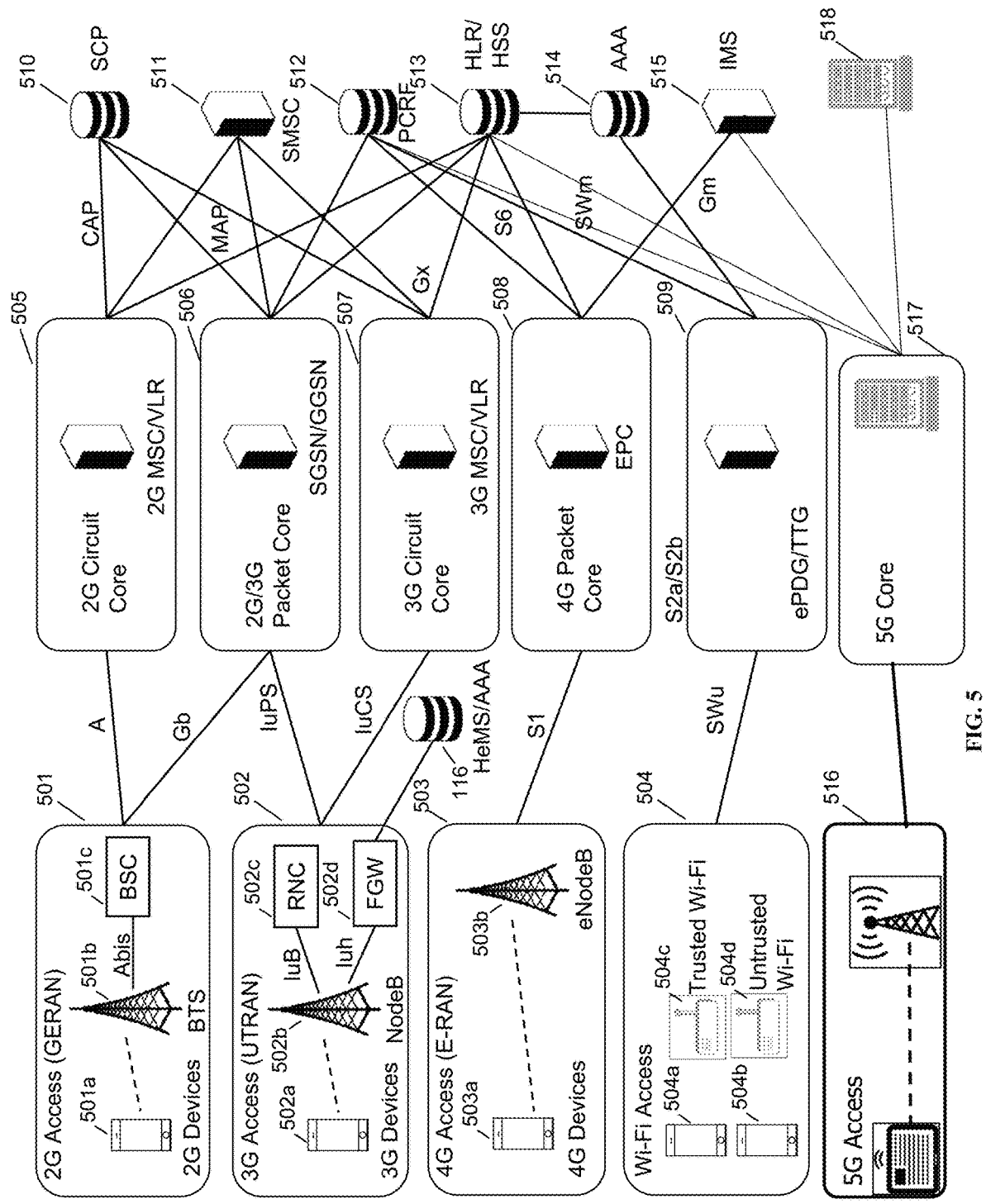
FIG. 5 is a schematic network architecture diagram for 3G and other-G prior art networks.

FIG. 5 is a schematic network architecture diagram for 3G and other-G prior art networks. The diagram shows a plurality of "Gs," including 2G, 3G, 4G, 5G and Wi-Fi. 2G is represented by GERAN 501, which includes a 2G device 501a, BTS 501b, and BSC 501c. 3G is represented by UTRAN 502, which includes a 3G UE 502a, nodeB 502b, RNC 502c, and femto gateway (FGW, which in 3GPP namespace is also known as a Home nodeB Gateway or HNBGW) 502d. 4G is represented by EUTRAN or E-RAN 503, which includes an LTE UE 503a and LTE eNodeB 503b. Wi-Fi is represented by Wi-Fi access network 504, which includes a trusted Wi-Fi access point 504c and an untrusted Wi-Fi access point 504d. The Wi-Fi devices 504a and 504b may access either AP 504c or 504d. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501c is required for Abis compatibility with BTS 501b, while for the 3G UTRAN, an RNC 502c is required for Iub compatibility and an FGW 502d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 6:
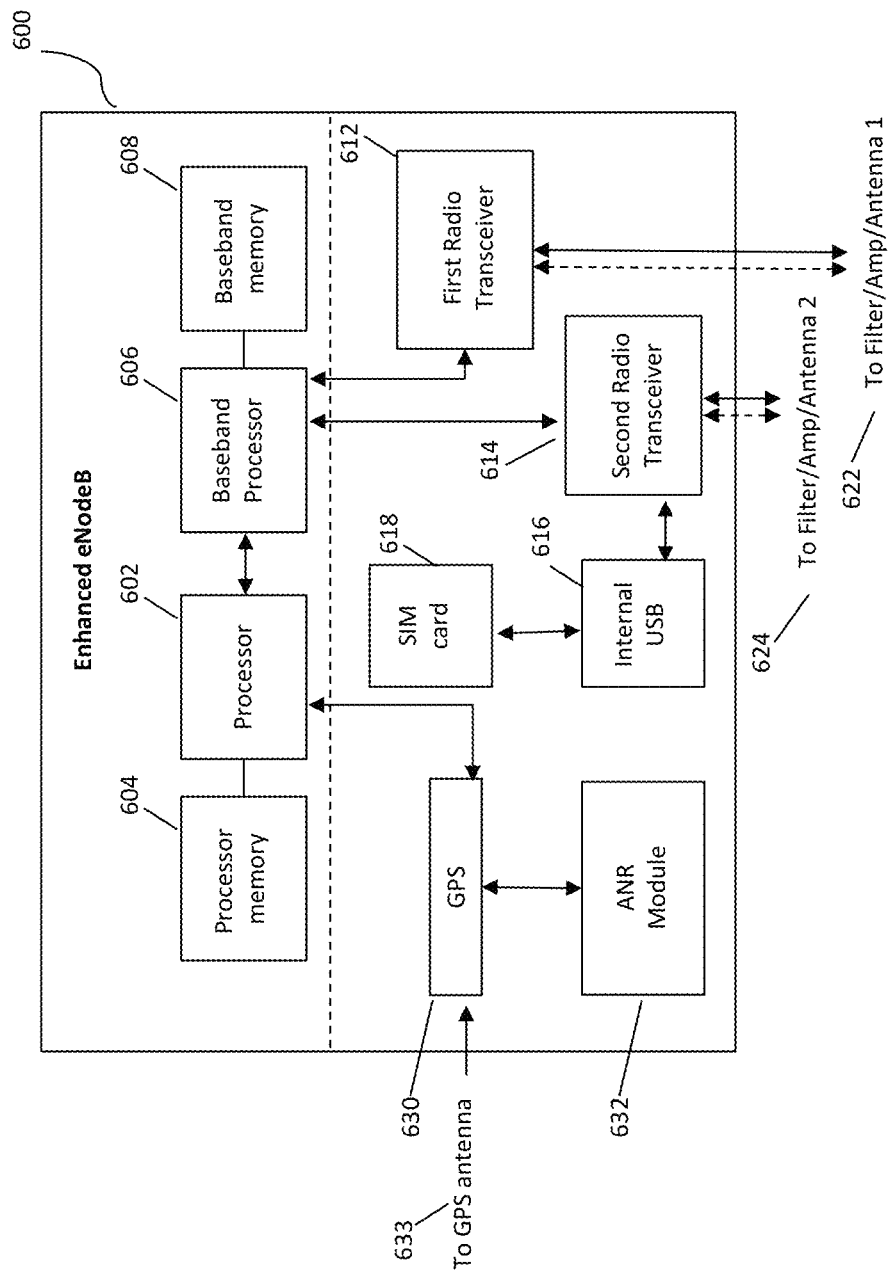
FIG. 6 is an enhanced eNodeB for performing the methods described herein, in accordance with some embodiments.

FIG. 6 shows an enhanced eNodeB for performing the methods described herein, in accordance with some embodiments. eNodeB 500 may include processor 502, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
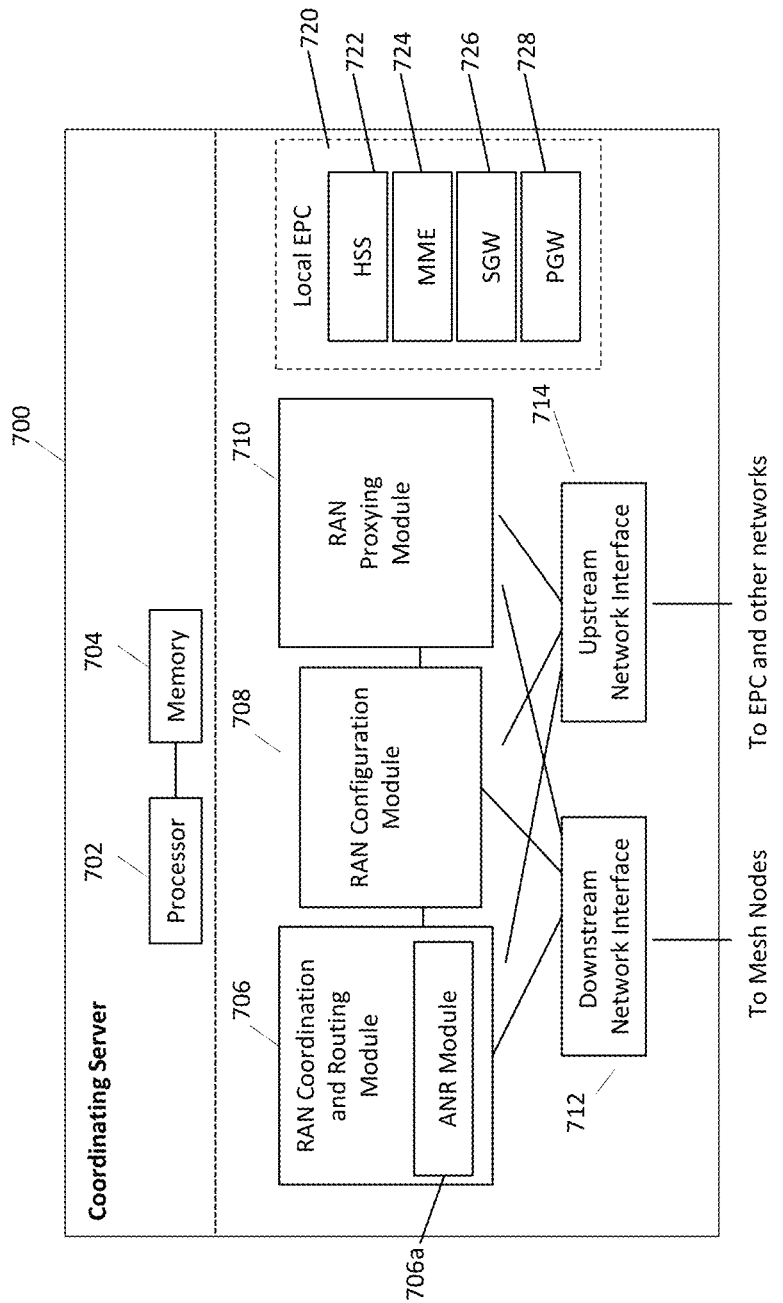
FIG. 7 is a coordinating server for providing services and performing methods as described herein, in accordance with some embodiments.

FIG. 7 shows a coordinating server for providing services and performing methods as described herein, in accordance with some embodiments. Coordinating server 600 includes processor 702 and memory 704, which are configured to provide the functions described herein. Also present are radio access network coordination/routing (RAN Coordination and routing) module 706, including ANR module 706a, RAN configuration module 708, and RAN proxying module 710. The ANR module 706a may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders, as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing hybrid functional splits for a system, the method comprising:
    defining, for a system having a Radio Unit (RU) and a Distributed Unit (DU) a Centralized Unit (CU) and an interface protocol between the RU to the DU and to the CU, a plurality of split options for balancing computer power and spectral efficiency, the plurality of split options including
    a split option 6 in which users are served by a single cell and
    a split option 7.x in which users are served by multi-cell joint processing; and
    running, by at least one of the DU or CU, at least one cellular protocol stack software (SW).

2. The method of claim 1 further comprising aggregating, by the RU, Radio Frequency (RF) capability and compute platform.

3. The method of claim 1 further comprising running PHY-manager management logic exercising split option 6 or 7.x based on the required processing capabilities.

4. The method of claim 1 wherein running at least one cellular protocol stack SW includes providing interfacing capabilities to one or more RUs distributed in space or co-located.

5. The method of claim 1 wherein running at least one cellular protocol stack SW includes providing a scheduling mechanism to decide when to apply single or joint processing of the data.

6. The method of claim 1 further comprising distributing, by the PHY manager, single PHY processing data and control data to the RU, and wherein the RU exercises split option 6 functionality.

7. The method of claim 6 further comprising a rest of the data path packets required for joint processing exercise split option 7.x.

8. The method of claim 7 further comprising processing a rest of the upper PHY in the DU or CU.

9. A non-transitory computer-readable medium containing instructions for providing hybrid functional splits for a system which, when executed, cause the system to perform steps comprising:
    defining, for a system having a Radio Unit (RU) and a Distributed Unit (DU) a Centralized Unit (CU) and an interface protocol between the RU to the DU and to the CU, a plurality of split options for balancing computer power and spectral efficiency, the plurality of split options including
    a split option 6 in which users are served by a single cell and
    a split option 7.x in which users are served by multi-cell joint processing; and
    running, by at least one of the DU or CU, at least one cellular protocol stack software (SW).

10. The computer-readable medium of claim 9 further comprising instructions for distributing, by the PHY manager, single PHY processing data and control data to the RU, and wherein the RU exercises split option 6 functionality.

11. The computer-readable medium of claim 10 further comprising instructions for a rest of the data path packets required for joint processing exercise split option 7.x.

12. The computer-readable medium of claim 11 further comprising instructions for processing a rest of the upper PHY in the DU or CU.

13. The computer-readable medium of claim 9 wherein the instructions for running at least one cellular protocol stack SW include instructions for providing interfacing capabilities to one or more RUs distributed in space or co-located.

14. The computer-readable medium of claim 9 wherein the instructions for running at least one cellular protocol stack SW includes instructions for providing a scheduling mechanism to decide when to apply single or joint processing of the data.

15. The computer-readable medium of claim 9 further comprising instructions for running PHY-manager management logic exercising split option 6 or 7.x based on the required processing capabilities.

16. The computer-readable medium of claim 9 further comprising instructions for aggregating, by the RU, Radio Frequency (RF) capability and compute platform.

\* \* \* \* \*